United States Patent Office 3,502,613
Patented Mar. 24, 1970

3,502,613
LIGHT AND HEAT STABILIZED POLY-PROPYLENE COMPOSITIONS
Richard S. Berger, Bartlesville, Okla., assignor to Shell Oil Company, New York, N.Y., a corporation of Delaware
No Drawing. Continuation-in-part of application Ser. No. 725,193, Apr. 29, 1968, which is a continuation-in-part of application Ser. No. 408,397, Nov. 2, 1964. This application Apr. 29, 1969, Ser. No. 820,277
Int. Cl. C08f 45/60
U.S. Cl. 260—45.8          6 Claims

ABSTRACT OF THE DISCLOSURE

Polypropylene is stabilized against actinic radiation and against heat degradation by incorporating therein a synergistic combination of light stabilizers consisting of a 2,4-di-tert-alkylphenyl 3,5-di-tert-alkyl-4-hydroxybenzoate and a 2-(2-hydroxy-3,5-dialkylphenyl)chlorobenzotriazole in combination with one or more specific heat stabilizers such as the alkylated phenols and the dialkyl esters of beta-thiodipropionic acid.

BACKGROUND OF THE INVENTION

This invention relates to the thermal and actinic stabilization of poly-alpha-olefins, particularly polypropylene.

This application is a continuation-in-part application of copending application Ser. No. 725,193, filed Apr. 29, 1968, now abandoned, which is a continuation-in-part application of application Ser. No. 408,397, filed Nov. 2, 1964, now abandoned.

It is known that stereoregular, crystallizable polypropylene, e.g., isotactic polypropylene, has physical and chemical properties which make it highly desirable for conversion into filaments. It may be made into filaments of large diameter, such as are useful for conversion into bristles, ropes automobile seat covers, lawn furniture covers and the like, and into filaments of a smaller diameter, such as are useful for conversion into yarns for production of textile fabrics. Fabrics produced from the polypropylene filaments are essentially shrink-proof and unaffected by water, completely inedible to moths and immune to mold. They are extremely durable because of the high tenacity and abrasion resistance of the fiber, and their heat-insulating value is excellent.

One of the outstanding properties of polypropylene filaments is their high breaking strength at ordinary temperature. This property is commonly designated "tenacity" or "breaking tenacity." It is expressed in grams per denier (g./d.). A denier is the thickness of a thread, i.e., filament, expressed as the weight in grams of 9000 meters. The breaking tenacity of typical commercial polypropylene fibers is in the range of from 4.5 to 6.5 g./d.

It is also known that poly-alpha-olefins undergo degradation on exposure to actinic radiation with consequent loss of their desirable physical and chemical properties, such as breaking tenacity. Particularly susceptible to such degradation is polypropylene. Upon irradiation by light from the sun or from sources of ultraviolet radiation, the polyolefins undergo rapid degradation. The result is rapid embrittlement and discoloration of the plastic, e.g., fabric.

Until recently, carbon black was the only light stabilizer available to manufacturers of polyolefins. None of the commercial ultraviolet stabilizers were compatible with, for example, polypropylene. Recently, compatible stabilizers have been developed, but many of these tend to discolor the composition containing them. Furthermore, not all ultraviolet absorbers are sufficiently nonvolatile to permit their inclusion in polyolefin compositions by hot milling or Banburying.

SUMMARY OF THE INVENTION

It is an object of this invention to provide a synergistic combination of light stabilizers for polymers of alpha-monoolefins of from 2 to 8 carbon atoms per molecule and, in particular, for filaments and for fabrics prepared from polypropylene filaments. Another object is to provide polypropylene fabrics which are not only stabilized against actinic radiation but are also stabilized against heat degradation.

It has now been found that when a special combination of actinic or light stabilizers are incorporated into polypropylene together with certain alkyl phenols, the resulting polypropylene has unexpectedly improved resistance to actinic radiation heretofore unobtainable. The polypropylene containing the instant special stabilizer combination may be converted into filaments and the filaments made into fabrics to provide textiles having extended life and durability.

DESCRIPTION OF THE PREFERRED EMBODIMENT

The present invention is particularly directed to stabilized polypropylene which has improved resistance to actinic radiation and to heat.

These unexpectedly improved physical properties are achieved by utilizing a special synergistic combination of "actinic" stabilizers together with one or more special "heat" stabilizers. It will be appreciated, however, that the essential feature of the instant invention is the special actinic stabilizer combination.

For convenience, the stabilizers which produce outstanding stabilizing performance, will be divided into two groups which will be designated as "actinic" stabilizers (Group I) and as "heat" stabilizers (Group II).

It will be readily apparent that the special stabilizer combination of the present invention consists of Group I, i.e., two particular stabilizers, and two stabilizers from Group II.

The stabilizers of Group I consist of a synergistic combination comprising:

(a) a 2,4-di-alkylphenyl 3,5-di-alkyl - 4 - hydroxybenzoate of the general formula:

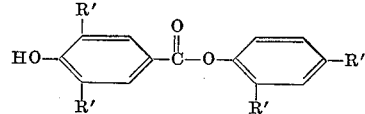

and (b) a 2-(2-hydroxy - 3,5 - dialkylphenyl)chlorobenzotriazole having the general formula:

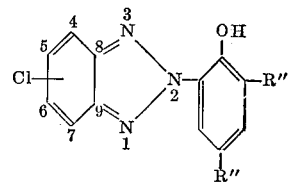

wherein the chlorine atom is attached to either the 4, 5, 6 or 7 carbon atom of the benzotriazole moiety. In the above Formulae (a) and (b), R' represents a tertiary alkyl radical of from 3 to 8 carbon atoms and preferably a tertiary butyl radical and R'' represents a methyl or tertiary alkyl radical of from 3 to 8 carbon atoms and more particularly a tertiary butyl radical. The preferred position for the chlorine atom is on the 5 carbon atom. Preferred chlorobenzotriazoles which exhibit excellent synergistic stabilization in combination with the other above-identified stabilizer are those marketed under the trade designation of Tinuvin® 327 and Tinuvin® 326 such as 2-(2-hydroxy-3,5-di-tert-butylphenyl)-5-chlorobenzotriazole and 2-(2-hydroxy-3-tert-butyl - 5 - methylphenyl)-5-chlorobenzotriazole, respectively.

Two very preferred synergistic combinations of Group I consists of:

(1)

(a) 2,4-di-tert-butylphenyl 3,5-di-tert-butyl-4-hydroxybenzoate, and (b) 2-(2-hydroxy-3,5-di-tert-butylphenyl)-5-chlorobenzotriazole, or (2)

(a) 2,4-ditert-butylphenyl 3,5-di-tert-butyl-4-hydroxybenzoate, and (b) 2-(2-hydroxy-3-tert-butyl-5-methylphenyl)-5-chlorobenzotriazole.

While the above synergistic combinations are preferred, also contemplated by the invention are other synergistic combinations such as those wherein R' of the formula above is 2,2-dimethylpropyl, 2,2-diethylbutyl, 2,2-dimethylbutyl, 2,2-dimethylpentyl, or combinations thereof and R" is a methyl or R' radical.

The proportions of the stabilizers of Group I which are incorporated into the polypropylene may be utilized in amounts up to about 10 parts by weight of the synergistic combination per 100 parts by weight of the polypropylene, expressed as 10 phr. wherein "phr." represents per one hundred parts by weight of the polypropylene. Generally, the individual stabilizers forming the synergistic combination of Group I are each present from about 0.01 to 1 phr., and preferably from 0.1 to 0.5 phr. Particularly outstanding stabilization is obtained when about 0.25 phr. of each stabilizer is utilized.

As noted hereinbefore, additional beneficial physical properties are obtained if certain "heat" stabilizers are used in combination with the stabilizers of Group I.

According to the invention heat stabilizers may also be incorporated into the polyolefin to provide additional protection. Since textile materials prepared from polypropylene filaments are suitable for a wide variety of applications, heat stabilizers are desirable in many instances, such as, for example, fabrics exposed to direct sun rays, i.e., lawn furniture or fabrics which are heated to elevated temperatures by sun rays passing through window glass whereby the fabric is not cooled by natural convection or air currents, i.e., houshold rugs, furniture fabrics, automobile seat covers, etc.

The heat stabilizers of Group II which may be incorporated into the polypropylene may be the more conventional heat stabilizers known in the art such as the sterically-hindered phenols, sulfides and amines.

A preferred synergistic heat stabilizer combination comprises 1,3,5-trimethyl - 2,4,6 - tri(3',5'-di-tert-butyl-4'-hydroxybenzyl)benzene and a dialkyl ester of beta-thiodi - propionic acid wherein the alkyl group contains from 12 to 30 carbon atoms, and is preferably dilauryl thiodipropionate (DLTP) or distearyl thiodipropionate (DSTP).

Excellent stabilizing results are also obtained when 1,3,5-trimethyl - 2,4,6 - tri(3',5'-di-tert-butyl-4'-hydroxybenzyl)benzene is used as the sole heat stabilizer of Group II.

Particularly outstanding results are obtained when the "heat" stabilizer of Group II is a stabilizer having the general formula:

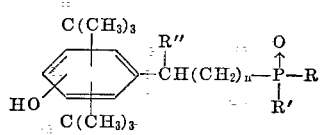

wherein R and R' are the same or different alkoxy groups containing from 12 to 24 carbon atoms, R" is hydrogen or an alkyl having 1 to 6 carbon atoms and $n$ is an integer having a value 0, 1, 2 or 3.

A very preferred such heat stabilizer is di-n-octadecyl 3,5-di-tert-butyl-4-hydroxybenzylphosphonate which has the following structural formula:

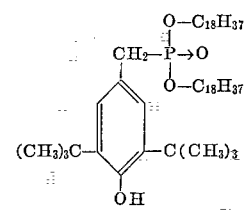

Another preferred heat stabilizer of Group II which is especially suitable for use in the present invention is pentaerythritol tetra-(3-3,5-di-tert-butyl - 4 - hydroxyphenyl) propionate which has the following structural formula:

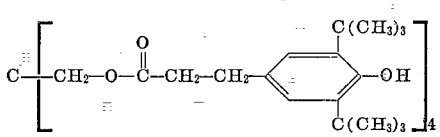

Still another preferred heat stabilizer of Group II is n-octadecyl-3-(3,5-di-tert-butyl - 4 - hydroxyphenyl(propionate) which has the following structural formula:

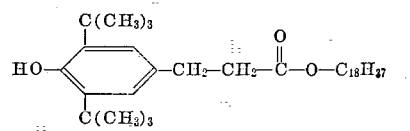

It has been found that in stabilizing polypropylene against actinic light and heat, that many heat stabilizers at relatively high concentrations tend to be antagonistic to the stabilizing effect of the light stabilizers. Therefore, it is advisable when heat stability of the polypropylene fabric is desired to maintain the concentration of the heat stabilizers in a range of from 0.01 to 0.5 phr., and preferably in a range of from 0.02 to 0.1 phr. Since fabrics wherein heat stabilizers are desirable, such as automobile seat covers, are not subjected to extreme temperatures over an extended period of time, concentrations in the range of 0.01 to 0.3 phr. of the heat stabilizers provide adequate protection to the fabric.

Particularly outstanding stabilization is achieved when the heat stabilizers of Group II are each utilized in amounts from about 0.1 to 0.50 phr. with from 0.01 to 0.30 phr. being preferred.

If DSTP or DLTP are utilized as one of the heat stabilizers of Group II, it may be desirable to use up to 1.0 phr. although from about 0.10 to 0.5 phr. is usually sufficient, depending, of course, on the amounts of other heat stabilizers employed.

Isotactic polypropylene from which textile fabrics are produced is prepared by polymerizing propylene with a highly stereospecific catalyst system of the well-known Ziegler-Natta type. Various processes and catalyst for producing such materials are illustrated, for example, in "Polyolefin Resin Processes" by Marshall Sittig, Gulf Publishing Co., Houston, Tex., 1961 and "Linear and Stereoregular Addition Polymers" by Gaylord and Mark, Interscience Publishers, Inc., New York 1959. The conversion of polypropylene into filaments and properties thereof are described in British Patent 813,891, published May 27, 1959, in an article by Coen and Conti in "Materie Plastiche," volume 26, pages 723–30 (1960); and in other recent publications.

In the production of the polypropylene filaments from propylene by melt spinning, the polymer is liquified in an extruder and the liquid extruded through an appropriate die into either monofilaments or multifilaments. The multifilaments are handled in a group thereof, whereas the monofilaments are handled singly. The filaments may be relatively coarse, e.g., from 30 denier up, or relatively fine, e.g., from 15 denier down.

Polypropylene suitable for use in the textile industry may be modified by incorporating therein organic molecules or organic or inorganic compounds of metals to provide improved dyeability characteristics or other properties. It has been found that certain metals contained in the compound for example aluminum, have undesirable effects upon the color of polypropylene when many of the now used conventional light stabilizers are present. The discoloration is believed to result from complexes formed from the metal and the stabilizer, the latter acting as a chelating agent. It has been found that no complex forms or discoloration occurs when the light stabilizers of the present invention are present in polypropylene which contains aluminum compounds.

The stabilizers may be incorporated into the polyolefin by any of the usual procedures for incorporating substances into a solid material to form a homogeneous blend. A simple method is to dissolve the stabilizers in a low boiling solvent, such as acetone or hexane, etc., and then mixing the stabilizer solution with the polymer in powder or other such form, evaporating the solvent to obtain the homogeneous blend. Another method is to incorporate the stabilizers by various mechanical means, such as tumbling or dry mixing, to form a homogeneous blend and subsequently extruding into filaments.

The following examples illustrate the present invention but it is not intended to be limited thereto. The examples demonstrate the synergistic effects of the light stabilizers and the heat stabilizers on the stability of the polypropylene compositions.

The following experiments were performed with polypropylene prepared with the aid of a catalyst system composed of titanium trichloride and aluminum diethyl chloride and having an intrinsic viscosity of 2.4 determined at 150° C. in decahydronaphthalene, and was extruded to form monofilaments having a diameter of 8 mils and having a breaking tenacity of 5–7 g./d. The filaments were individually mounted on a rack so that the actinic radiation penetrated the filaments at approximately a 90° angle thereto. The actinic radiation apparatus employed was an Atlas DLTS-Enclosed Twin-Arc Weatherometer with the water spray cycle removed and modified as described in Analytical Chemistry 25, 460 (1953), wherein eight Westinghouse 20 watt fluorescent Sun Lamps were additionally mounted vertically about 2 inches inside the revolving sample drum, with four at each side, leaving a free working space at the front of about 16 inches wide. Two tubes were replaced every 400 hours to insure near constancy of radiation over entire testing period.

EXAMPLE I

Polypropylene filaments (8 mils diameter) were prepared by incorporating in the polypropylene 0.03 phr. of 1,3,5 - trimethyl - 2,4,6 - tri(3',5' - di - tert - butyl - 4'- hydroxybenzyl)benzene (THB): 0.20 phr. of dilauryl thiodipropionate (DLTP), and varying amounts of actinic stabilizers (a) 2,4-di-tert-butylphenyl 3,5-di-tert-butyl-4-hydroxybenzoate and (b) 2-(2-hydroxy-3,5-di-tert-butylphenyl)-5-chlorobenzotriazole.

The propylene filaments containing varying amounts of the actinic stabilizers were placed in the Atlas Weatherometer and the tensile strength was determined after various periods of exposure according to the procedure of ASTM D885–62T. The comparative results are tabulated in Table I.

TABLE I

| Stabilizers, phr. | | | | Initial | | Percent tenacity retained after X hours exposure | | | | |
| --- | --- | --- | --- | --- | --- | --- | --- | --- | --- | --- |
| DLTP [1] | THB [2] | TBB [3] | CBT [4] | Tenacity g./d. | Elongation Percent | 280 | 420 | 480 | 560 | 580 |
| 0.20 | 0.03 | 0.50 | 0.00 | 7.65 | 25.7 | 65.3 | 21.9 | F | | |
| 0.20 | 0.03 | 0.25 | 0.25 | 7.48 | 26.1 | 64.3 | 46.1 | | 23.9 | 15.1T |
| 0.20 | 0.03 | 0.00 | 0.50 | 7.71 | 24.0 | 36.3 | 15.5 | 11.1T | | |

[1] Dilauryl thiodipropionate.
[2] 1,3,5-trimethyl-2,4,6-tri(3',t'-di-tert-butyl-4'-hydroxybenzyl)benzene.
[3] 2,4-di-tert-butylphenyl 3,5-di-tert-butyl-4-hydroxybenzoate.
[4] 2-(2-hydroxy-3,5-di-tert-butylphenyl)-5-chlorobenzotriazole.
T=Test terminated.
F=Sample failed.

EXAMPLE II

The procedures of Example I were substantially repeated wherein the dilauryl thiodipropionate is replaced with an equal amount of distearyl thiodipropionate and wherein the dilauryl thiodipropionate is eliminated. In both instances, the synergistic effect of the TBB/CBT combination was clearly shown.

EXAMPLE III

The procedures of Examples I and II were substantially repeated wherein the 2-(2-hydroxy-3,5-di-tert-butylphenyl)-5-chlorobenzotriazole is replaced with equal amounts of 2-(2-hydroxy-3-tert-butyl-5-methylphenyl)-5-chlorobenzotriazole. Related synergistic stabilizing results are obtained.

EXAMPLE IV

Polypropylene filaments as in Example I were prepared by incorporating 0.20 phr. of DLTP and 0.075 phr. of n-octadecyl - 3 - (3,5 - di - tert - butyl-4-hydroxyphenyl)propionate together with various amounts of actinic stabilizers (a) 2,4 - di - tert - butylphenyl-3,5-di-tert-butyl-4-hydroxybenzoate and (b) 2-(2-hydroxy-3,5-di-tert-butylphenyl)-5-chlorobenzotriazole.

The comparative results as determined by the test procedures described hereinbefore are tabulated in Table II.

TABLE II

| Stabilizers, phr. | | | | Initial | | Percent tenacity retained after X hours exposure | | | | | |
| --- | --- | --- | --- | --- | --- | --- | --- | --- | --- | --- | --- |
| DSTP [1] | OHP [2] | TBB [3] | CBT [4] | Tenacity, g./d. | Elongation, percent | 280 | 420 | 480 | 560 | 580 | 680 |
| 0.20 | 0.075 | 0.50 | 0.00 | 7.55 | 24.9 | 72.8 | 55.2 | 26.9T | | | |
| 0.20 | 0.075 | 0.25 | 0.25 | 7.55 | 23.3 | 68.7 | 52.1 | | 38.6 | | 13.9T |
| 0.20 | 0.075 | 0.00 | 0.50 | 7.68 | 23.8 | 43.9 | 20.1 | | 6.1T | | |

[1] Distearyl thiodipropionate.
[2] n-Octadecyl-3-(3,5-di-tert-butyl-4-hydroxyphenyl)propionate.
[3] 2,4-di-tert-butylphenyl 3,5-di-tert-butyl-4-hydroxybenzoate.
[4] 2-(2-hydroxy-3,5-di-tert-butylphenyl)-5-chlorobenzotriazole.
T=Test terminated.

EXAMPLE V

The procedures of Example IV were substantially followed wherein the 2-(2-hydroxy-3,5-di-tert-butylphenyl)-5-chlorobenzotriazole is replaced with equal amounts of 2-(2-hydroxy - 3 - tert - butyl-5-methylphenyl)-5-chlorobenzotriazole.

EXAMPLE VI

The procedures of Example IV were substantially repeated wherein 0.20 phr. of $TiO_2$ was additionally added to the composition. The comparative results are tabulated in Table III.

TABLE III

| Stabilizers, phr. | | | | Initial | | Percent tenacity retained after X hours exposure | | | | | | | | |
|---|---|---|---|---|---|---|---|---|---|---|---|---|---|---|
| DSTP[1] | OHP[2] | TBB[3] | CTB[4] | Tenacity, g./d. | Elongation, percent | 280 | 420 | 480 | 560 | 580 | 680 | 700 | 840 | 860 |
| 0.20 | 0.075 | 0.50 | 0.00 | 7.45 | 24.9 | 73.7 | 49.6 | ---- | 29.3 | ---- | 20.6T | ---- | ---- | ---- |
| 0.20 | 0.075 | 0.25 | 0.25 | 7.21 | 22.7 | 73.5 | 52.4 | ---- | 44.6 | ---- | ---- | 26.6 | 18.4 | 14.5T |
| 0.20 | 0.075 | 0.00 | 0.50 | 7.42 | 24.3 | 35.2 | 13.0 | 9.6T | ---- | ---- | ---- | ---- | ---- | ---- |

[1] Distearyl thiodipropionate.
[2] n-Octadecyl-3-(3-5-di-tert-butyl-4-hydroxyphenyl)propionate.
[3] 2',4'-di-tert-butylphenyl 3,5-di-tert-butyl-4-hydroxybenzoate.
[4] 2-(2'-hydroxy-3',5'-di-tert-butylphenyl)-5-chlorobenzotriazole.
T = Test terminated.

EXAMPLE VII

Polypropylene filaments (8 mils diameter) were prepared by incorporating in polypropylene, 0.50 phr. of 2,4-di-tert-butylphenyl 3,5-di-tert-butyl-4-hydroxybenzoate as actinic stabilizer and 0.25 phr. of distearyl thiodipropionate (DSTP) and 0.05 phr. of di-n-octadecyl-3,5-di-tert-butyl-4-hydroxybenzylphosphonate.

Polypropylene filaments were also prepared wherein the actinic stabilizer was 0.50 phr. of 2-(2-hydroxy-3,5-di-tert-butylphenyl)-5-chlorobenzotriazole.

Polypropylene filaments were also prepared wherein the actinic stabilizer was 0.25 phr. of 2,4-di-tert-butylphenyl 3,5-di-tert-butyl-4-hydroxybenzoate and 0.25 phr. of 2-(2-hydroxy-3,5-di-tert-butylphenyl)-5-chlorobenzotriazole.

The propylene filaments containing varying amounts of actinic stabilizers were placed in the Atlas Weatherometer. After 840 hours of exposure, the filaments were tested according to the procedures of ASTM D885-62T wherein the tensile strength was determined, and the results are tabulated as follows:

TABLE IV

| Heat stabilizers | | Actinic Stabilizers | | Percent tenacity retained after 840 hours |
|---|---|---|---|---|
| DSTP[1] | OBP[2] | TBB[4] | CBT[4] | |
| 0.25 | 0.05 | 0.50 | ---- | 32 |
| 0.25 | 0.05 | ---- | 0.50 | 34 |
| 0.25 | 0.05 | 0.25 | 0.25 | 52 |

[1] Distearyl thiodipropionate.
[2] Di-n-octadecyl-3,5-di-tert-butyl-4-hydroxybenzylphosphonate.
[3] 2,4-di-tert-butylphenyl 3,5-di-tert-butyl-4-hydroxybenzoate.
[4] 2-(2-hydroxy-3,5-di-tert-butyl)-5-chlorobenzotriazole.

EXAMPLE VIII

The procedures of Example VII were substantially repeated wherein the di-n-octadecyl-3,5-di-tert-butyl-4-hydroxybenzylphosphonate is replaced with equal amounts of pentaerythritol tetra-[3-(3,5-tert-butyl-4-hydroxyphenyl)propionate]. Similar synergistic actinic stabilization is obtained.

I claim as my invention:

1. A polypropylene composition having improved stabilization against actinic radiation and heat which comprises:
    (A) polypropylene and
    (B) a synergistic combination of stabilizers consisting of:
        (1) from 0.01 to 1.0 part per one hundred parts by weight of polypropylene of 2,4-di-tert-butylphenyl 3,5-di-tert-butyl-4-hydroxybenzoate;
        (2) from 0.01 to 1.0 part per one hundred parts by weight of polypropylene of a chlorobenzotriazole selected from the group consisting of 2 - (2 - hydroxy - 3,5 - di - tert - butylphenyl)-5-dichlorobenzotriazole and 2-(2-hydroxy-3-tert-butyl-5-methyl-phenyl)-5-chlorobenzotriazole;
        (3) from 0.01 to 0.50 part per one hundred parts by weight of polypropylene of a stabilizer selected from the group consisting of:
            (a) 1,3,5 - trimethyl - 2,4,6 - tri(3',5' - di - tert-butyl-4'-hydroxybenzyl)benzene,
            (b) n - octadecyl - 3 - (3,5 - di - tert - butyl-4-hydroxyphenyl)propionate, and
            (c) di - n - octadecyl - 3,5 - di - tert - butyl-4-hydroxybenzyl)phosphonate, and
        (4) from 0.01 to 0.50 part per one hundred parts by weight of polypropylene of a dialkyl ester of beta thiodipropionic acid selected from the group consisting of:
            (a) distearyl thiodipropionate, and
            (b) dilauryl thiodipropionate.

2. The stabilized polypropylene composition of claim 1 which comprises:
    (A) polypropylene and
    (B) a synergistic combination consisting of:
        (1) from 0.01 to 0.5 phr. of 2,4-di-tert-butylphenyl 3,5-di-tert-butyl-4-hydroxybenzoate,
        (2) from 0.1 to 0.5 phr. of 2-(2-hydroxy-3,5-di-tert-butylphenyl)-5-chlorobenzotriazole,
        (3) from 0.01 to 0.3 phr. of 1,3,5-trimethyl-2,4,6-tri(3',5' - di - tert - butyl - 4' - hydroxybenzyl)benzene, and
        (4) from 0.10 to 0.50 phr. of distearyl thiodipropionate.

3. The stabilized polypropylene composition of claim 1 which comprises:
    (A) polypropylene and
    (B) a synergistic combination consisting of:
        (1) from 0.01 to 0.5 phr. of 2,4-di-tert-butylphenyl 3,5-di-tert-butyl-4-hydroxybenzoate,
        (2) from 0.01 to 0.5 phr. of 2-(2-hydroxy-3-tert-butyl-5-methylphenyl)-5-chlorobenzotriazole,
        (3) from 0.01 to 0.3 phr. of 1,3,5-trimethyl-2,4,6-tri(3',5' - di - tert - butyl - 4' - hydroxybenzyl)benzene, and
        (4) from 0.10 to 0.50 phr. of distearyl thiodipropionate.

4. The stabilized polypropylene composition of claim 1 which comprises:
    (A) polypropylene and
    (B) a synergistic combination consisting of:
        (1) from 0.1 to 0.5 phr. of 2,4-di-tert-butylphenyl 3,5-di-tert-butyl-4-hydroxybenzoate,
        (2) from 0.1 to 0.5 phr. of 2-(2-hydroxy-3-tert-butyl-5-methylphenyl)-5-chlorobenzotriazole,
        (3) from 0.01 to 0.30 phr. of 1,3,5-trimethyl-2,4,6-tri(3',5'-di-tert-butyl - 4' - hydroxybenzyl)benzene, and
        (4) from 0.1 to 0.50 phr. of distearyl thiodipropionate.

5. The stabilized polypropylene composition as in claim 1 which comprises:
    (A) polypropylene and
    (B) (1) from 0.1 to 0.5 phr. of 2,4-di-tert-butylphenyl 3,5-di-tert-butyl-4-hydroxybenzoate,
        (2) from 0.1 to 0.5 phr. of 2-(2-hydroxy-3,5-di-tert-butylphenyl)-5-chlorobenzotriazole,
        (3) from 0.01 to 0.3 phr. of n-octadecyl-3-(3,5-di-tert-butyl-4-hydroxyphenyl)propionate, and
        (4) from 0.10 to 0.50 phr. of dilauryl thiodipropionate.

6. The stabilized polypropylene composition as in claim 1 which comprises:
    (A) polypropylene and
    (B) (1) from 0.1 to 0.5 phr. of 2,4-di-tert-butylphenyl 3,5-di-tert-butyl-4-hydroxybenzoate,
        (2) from 0.1 to 0.5 phr. of 2-(2-hydroxy-3,5-di-tert-butylphenyl)-5-chlorobenzotriazole, (3) from 0.01 to 0.30 phr. of di-n-octadecyl-3,5-di-tert-butyl-4-hydroxybenzylphosphonate, and
(4) from 0.10 to 0.50 phr. of distearyl thiodipropionate.

References Cited

UNITED STATES PATENTS

| | | | |
|---|---|---|---|
| 3,112,388 | 11/1963 | Smutny et al. | 260—45.85 XR |
| 3,190,852 | 6/1965 | Doyle | 260—45.85 |
| 3,247,240 | 4/1966 | Meier et al. | 260—45.85 XR |
| 3,280,070 | 10/1966 | Di Battista et al. | 260—45.85 |
| 3,285,855 | 11/1966 | Dexter et al. | 260—45.85 XR |

FOREIGN PATENTS

| | | |
|---|---|---|
| 1,329,114 | 12/1963 | France. |

DONALD E. CZAJA, Primary Examiner

M. J. WELSH, Assistant Examiner

U.S. Cl. X.R.

260—45.85, 45.95